(No Model.)
S. B. RATHBUN.
Churn.
No. 237,598. Patented Feb. 8, 1881.
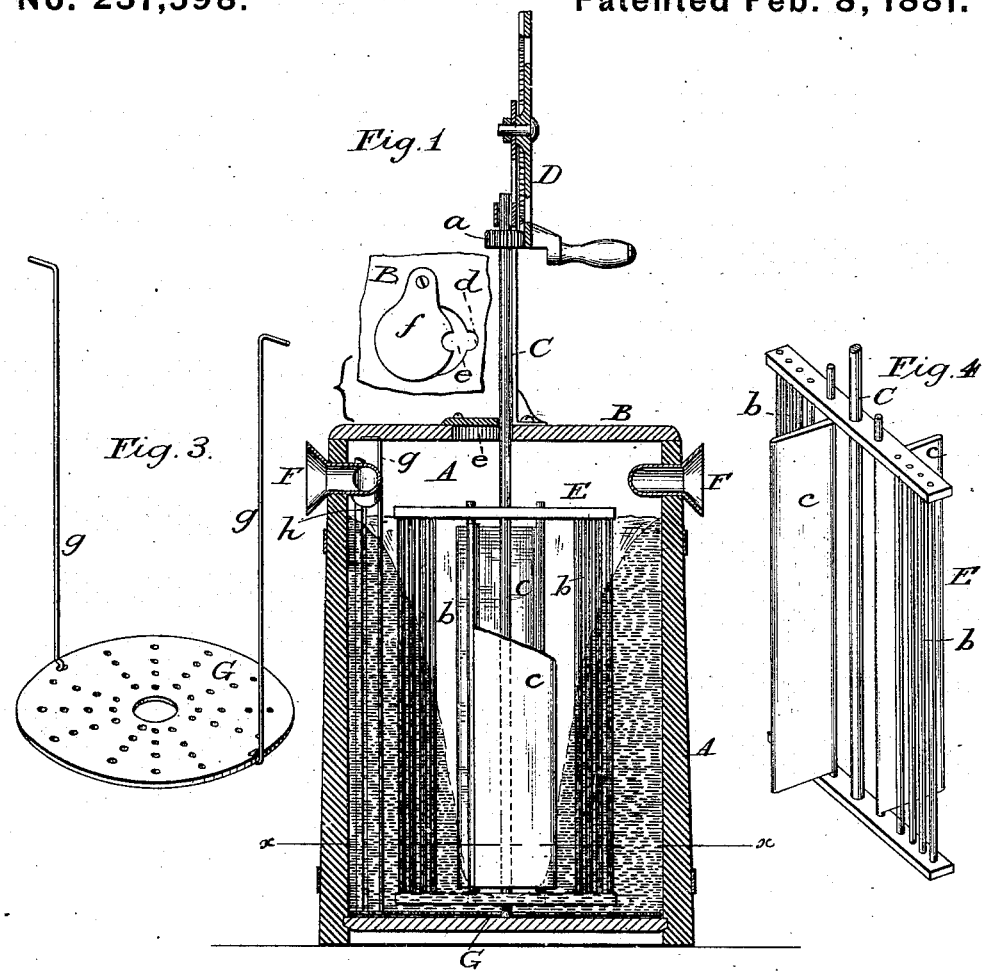
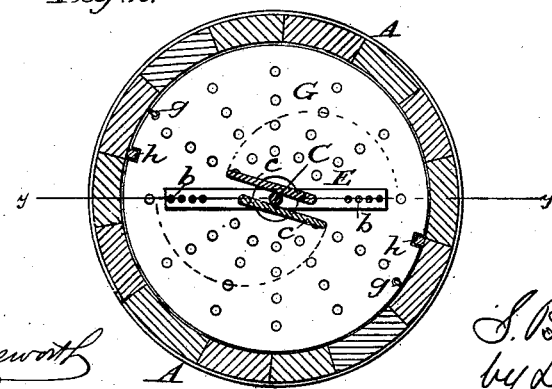
Attest.
Sidney B. Hollingsworth
Nathan C. Lane
Inventor.
S. B. Rathbun,
by Dodge & Son
Attys.

UNITED STATES PATENT OFFICE.

STEPHEN B. RATHBUN, OF CARLETON, MICHIGAN.

CHURN.

SPECIFICATION forming part of Letters Patent No. 237,598, dated February 8, 1881.

Application filed October 11, 1880. (No model.)

*To all whom it may concern:*

Be it known that I, STEPHEN B. RATHBUN, of Carleton, in the county of Monroe and State of Michigan, have invented certain Improvements in Churns, of which the following is a specification.

My invention relates to rotary churns; and it consists in the combination, with a body having suitable air inlets and outlets, of a beater substantially the same in construction as that for which Letters Patent were granted to me, bearing date the 12th day of March, 1878, and numbered 201,287.

Figure 1 represents a vertical section through the body of my improved churn, the internal parts being shown in full; Fig. 2, a horizontal section on the line x x of Fig. 1, and Figs. 3 and 4 perspective views of the strainer and beater removed from the churn.

The advantage of causing fresh air to pass through the cream or milk in churning has long been known, and many attempts have been made to accomplish such result. The present invention is designed to effect this object with as little modification or complication as possible over churns in use, and this I find can be done with great advantage by simply providing a churn employing the peculiar beater above referred to with suitable air inlets and outlets, the beater serving to produce the necessary air-current.

In the practical operation of the churn provided with such beater the cream or milk is thrown outward thereby, forming a cylindrical body around the walls of the churn open at the center from the top to or nearly to the bottom. As the beater revolves the surface of the cream or milk is constantly changing, and owing to the large surface presented by the opening in the middle every particle is exposed to the air within the churn. In order that this air may be constantly and rapidly changing, it is only necessary to provide air inlets and outlets, the beater acting in the same manner as a fan to draw the air in at the center and expel it at the circumference. This action will be more clearly understood by referring to the accompanying drawings, in which—

A represents the body of the churn, provided with a cover, B, a central spindle, C, carrying at its upper end a pinion, a, driven by a gear-wheel, D, and at its lower part, or within the body, provided with the beater E. As above stated, this beater is of substantially the construction shown in my patent before named; but I wish it to be understood that the beater may, in the present instance, be constructed of any suitable material, provided the same principle of operation be retained. This beater consists of two horizontal heads or cross-bars secured to the central spindle, and provided on each side of the center with a series of vertical rods, b, and between the rods and the spindle, with a leaf or blade, c, hinged at its inner edge and capable of swinging outward across the rods.

The cover B, in order to permit its ready removal and replacement over the pinion a, is furnished, in addition to the central opening, d, in which the shaft turns, with a larger opening, e, communicating with the first, and of sufficient diameter to permit the pinion a to pass freely through it, said larger opening being closed, when desired, by a swinging cover, f. The upper and lower extremities of the spindle C being carried, the former in a box or bearing and the lower in a step, no support is needed where it passes through the top B. Hence the cover f may be left open to admit air, if desired.

F F represent two funnel-mouthed tubes or pipes passing through the side walls of the churn-body, and serving as outlets for the air drawn in at the center. In order that the cream or milk may not be thrown into these pipes, their ends within the churn are inclined slightly in the direction in which the beater moves in operation.

From the above it will be seen that the air will be drawn down into the center of the churn, thrown outward by the beater, and expelled by the same means at the sides through the pipes F. The fact that there is a current of air constantly entering the churn at one point and leaving it at another insures a constant and rapid change of air, for even though the incoming air may not be drawn entirely downward to the bottom, still the outgoing current will draw the air therefrom, and its place will be supplied by other and fresher air. The cream or milk being in the form of a hollow cylinder with a constantly-changing surface, it follows that every particle must be subjected to contact with the air.

It is obvious that other air-inlets may be provided, if desired.

In order to facilitate the separation and removal of the butter when collected from the milk, I provide a perforated plate or strainer, G, which is placed in and rests upon the bottom of the churn, and is provided with wires or rods $g$, which extend upward and have their ends bent outward over the chines, as shown, to enable the attendant to lift it out when desired. The plate, being perforated, permits the milk to run off, while retaining every particle of the butter, and in this way a perfect separation is effected.

The churn-body is provided, as shown in Fig. 2, with vertical ribs or abutments $h$ on its inner face, by which the cream or milk is caused to roll and turn upon itself, instead of simply following or going before the beater, thus more thoroughly changing the surface presented to the air.

The churn being thus constructed, the strainer or plate is first placed in position, then the beater, and next the cream or milk is supplied. The cover, with its driving-gear, is finally placed in position and the beater caused to revolve from left to right, the vertical rods being thus caused to act upon the contents, while the blades or wings occupy the position shown in Fig. 2. The globules being in this way broken, and the grains or particles of butter all liberated, the beater is turned alternately forward and backward, and the butter thereby collected into two large rolls by the action of the wings or blades.

The particular form and arrangement of the gearing constitute no part of my invention, but may be modified as desired.

By reference to Figs. 1 and 3 it will be seen that the plate or strainer G is provided with a central opening to permit it to fit around the spindle or its step. This opening may be dispensed with by forming a depression at the center to receive the end of the spindle; but the arrangement shown is preferred.

I am aware that rotary churns have hitherto been provided with air inlets and outlets, and with various devices for causing a circulation of air through them. I am also aware that a removable strainer independent of the beater has been used, and hence I make no claim to either of said features, broadly. I am not, however, aware that any one has ever before combined a beater of the construction herein described and shown with a churn-body having air inlets and outlets, by which combination I secure results which cannot be attained by other devices or combinations of which I have knowledge, nor, as I believe, by any other apparatus whatever. As the beater turns forward the cream is thrown outward and assumes the form of a hollow cylinder, presenting an extended and constantly-changing surface to the air, the blades of the beater remaining during such forward rotation folded inward against and standing in plane tangential to the spindle, and being thereby caused to draw air inward and downward at the center and to force it outward over the surface of the cream and through the outlets at the sides of the body. This action, while being highly productive of beneficial results, is unattended with increase of cost or complication of parts.

Having thus described my invention, what I claim is—

1. In combination with a churn-body having an air-inlet at or near the center and one or more outlets at or near the circumference, a rotary vertical beater consisting of a central spindle, vertical rods, and hinged vertical blades, constructed and arranged substantially as shown.

2. The herein-described churn, consisting of the body provided with internal ribs and with air inlets and outlets, located at the center and circumference respectively, and the beater E, having vertical rods and hinged blades, the latter adapted to produce a current of air through the body when the beater is turned forward and to gather the butter-particles when the motion is reversed, as set forth.

STEPHEN B. RATHBUN.

Witnesses:
GUSTAVUS BRANDES,
JOHN L. HOOD.